United States Patent [19]

Lehnert et al.

[11] Patent Number: 5,285,445
[45] Date of Patent: Feb. 8, 1994

[54] SWITCHING NETWORK AND SWITCHING NETWORK CONTROL FOR A SWITCHING NODE IN A WIDEBAND TRANSMISSION SYSTEM

[75] Inventors: Ralf Lehnert, Kalchreuth; Wolfgang Kowalk, Nuremberg, both of Fed. Rep. of Germany

[73] Assignee: U.S. Philips Corporation, New York, N.Y.

[21] Appl. No.: 982,103

[22] Filed: Nov. 24, 1992

Related U.S. Application Data

[63] Continuation of Ser. No. 762,032, Sep. 16, 1990, which is a continuation of Ser. No. 630,363, Dec. 18, 1990, which is a continuation of Ser. No. 282,084, Dec. 9, 1988.

[30] Foreign Application Priority Data

Dec. 17, 1987 [DE] Fed. Rep. of Germany ....... 3742748

[51] Int. Cl.$^5$ .................................... H04L 12/56
[52] U.S. Cl. .................................... 370/60; 370/65.5
[58] Field of Search ............... 370/58.1, 58.2, 60, 370/65.5

[56] References Cited

U.S. PATENT DOCUMENTS

| | | | |
|---|---|---|---|
| 4,550,402 | 10/1985 | Gable et al. | 370/94 |
| 4,644,533 | 2/1987 | Braff et al. | 370/60 |
| 4,718,058 | 1/1988 | van Vugt | 370/58.1 |
| 4,754,451 | 6/1988 | Eng et al. | 370/60 |
| 4,760,570 | 7/1988 | Acampora et al. | 370/60 |
| 4,771,418 | 9/1988 | Narashimhan et al. | 370/58 |
| 4,771,419 | 9/1988 | Graves et al. | 370/60 |
| 4,788,679 | 11/1988 | Kataoka et al. | 370/60 |
| 4,821,258 | 4/1989 | Fraser | 370/60 |
| 4,866,701 | 9/1989 | Giacopelli et al. | 370/65 |
| 4,884,264 | 11/1989 | Servel et al. | 370/58.1 |
| 4,970,505 | 11/1990 | Hirata et al. | 340/825.8 |

FOREIGN PATENT DOCUMENTS 0183592  6/1986  European Pat. Off. ..... H04L 11/20
3714385  11/1988  Fed. Rep. of Germany ......... H04L 11/20

OTHER PUBLICATIONS

Y. S. Yeh et al., "The Knockout Switch ... " IEEE J. on Sel. Areas Comm., vol. SAC-5, No. 8, Oct. 1987, pp. 1274–1283; referred to in spec.

S. Nojima et al., "Integrated Services Packet Network Using Bus Matrix Switch", IEEE Journal on Selected Areas in Communications, SAC-5 (1987) Oct., No. 8, pp. 1284–1292.

A. Kitamura et al., "High Speed and High Capacity Packet Switching System Architecture", International Switching Symposium 1987, Mar. 15-20, 1987, pp. 809-813.

Y. Tamir et al., "High-Performance Multi-Queue Buffers for VLSI Communication Switches", 15th International Symposium On Computer Architecture, May 30–Jun. 2, 1988, pp. 343–354.

Primary Examiner—Wellington Chin
Assistant Examiner—Min Jung
Attorney, Agent, or Firm—Anne E. Barschall

[57] ABSTRACT

In the future, integrated wideband networks, especially the arrangement of switching networks and switching network controls, will be of particular importance. To avoid bottle-necks in the switching network a number of different measures or combinations thereof are taken. These measures include that: a) the transfer rate of the switching network is enlarged by a structural change; b) the switching network is multiplied; c) the input buffers are re-arranged; and d) the allocation strategy is changed.

9 Claims, 4 Drawing Sheets

SWITCHING NETWORK AND SWITCHING NETWORK CONTROL FOR A SWITCHING NODE IN A WIDEBAND TRANSMISSION SYSTEM

This is a continuation of application Ser. No. 07/762,032, filed on Sep. 16, 1990, which is a continuation of Ser. No. 07/630,363, filed on Dec. 18, 1990, which is a continuation of Ser. No. 07/282,084, filed on Dec. 9, 1988.

The invention relates to a switching network for a switching node in a wideband transmission system.

The scope of the development of future, integrated wideband networks discussions are held according to which method the digital or analog information—partly requiring a large bandwidth—is to be transmitted in digital networks. Packet switching, in which the (digital) messages are segmented into packets, with each packet containing extra information in addition to the useful information, which contain among other things indications about the destination (address), have been known for a long time. On the basis of their packet addresses the messages consequently allow to be conveyed to the partner sharing the connection, which requires transmission capacity only when a message is actually to be transmitted.

Furthermore, circuit switching has been known for a long time, which requires transmission capacity for the total duration of the connection—irrespective of the fact whether messages are actually being transmitted or not. Specifically in the telephone network two-way transmission paths are made available, although in general only either one of the two telephone subscribers is speaking.

So far, the implementation of packet switching in data traffic has led to transfer rates of the order of 1 to upwards of 1000 packets per second. For future services that implement the method of packet switching, for example in picture communication, a thousand times more packets are to be sent. In order to attain such transfer rates, in the Asynchronous Transfer Mode (ATM) the time consuming operation of routing is separated from the actual switching process and the packets are distributed over the transmission paths according to their destination addresses. Highly simplified routing that allows to be rapidly evaluated by specific circuit arrangements is used to accelerate the switching process in the switching networks. At the input of the switching node the arriving data packets are processed decentrally, as they contain internal addressing information which is in accordance with their destination, are switched through the central switching network and are then transferred to the output without the internal addressing information.

Embodiments of the "ATM" are Asynchronous Time Division (ATD) and Fast Packet Switching (FPS). With respect to the transfer mode a distinction is made between "Synchronous Transfer Mode" and "Asynchronous Transfer Mode" as well as the mixing form "Hybrid Configurations". In the Synchronous Transfer Mode a specific transmission channel is identified only on account of its distance in time from a synchronizing word. In the Asynchronous Transfer Mode each channel is identified by the addresses (headers) of its packets (blocks), especially the beginning of the blocks can be recognized, so that the headers can be evaluated. Flags or an inferior synchronous structure are used supposing a constant block length. An example thereof is "Asynchronous Time Division", in which synchronizing words are repeatedly inserted into the bit stream as "empty blocks".

The availability of wideband networks depends on many factors, among other things on the standardization, the cost effective optical wideband transmission, the VLSI-circuits for very high processing rates, as well as the requirements of the users and network operators. The concept of such wideband networks is based on the recently created integrated services telephone network ISDN.

A first possibility for extending the integrated services telephone network ISDN consists of providing a limited number of wideband channels, while for each wideband channel a physical link is realised. However, the network created thus having a circuit-switching facility does not meet all the requirements of the network operator with respect to an adaptable network for transmitting all sorts of services, among which are also services that do not yet have internationally standardized parameters, such as future services.

In the European Patent Specification No. 0 183 592 a wideband transmission system has been proposed, in which the message is subdivided into blocks (cells) and transmitted through wideband transmission links according to an asynchronous time-division multiplex method. The blocks (cells) can have the same or different lengths. The blocks comprise useful as well as address information, whereas the address information is accommodated in a so-called header. The number of bits of a block is designated as the block length, whereas the standardization proposals in this context provide values between 120 and 256 bits for the useful information and 32 or 16 bits for the header. The time intervals, in which the blocks are transmitted, are designated as frames. A frame can comprise a valid block or be empty. Between two subscribers of the wideband transmission system there is a virtual connection which is maintained in that the blocks transmitted from the subscriber stations are provided with unique header codes, which allow the switching nodes of correctly conveying the blocks. The blocks arriving at the switching node of an incoming line are transferred onto an outgoing line after a conversion of the header. Since two or a plurality of blocks may arrive for the same outgoing line during one frame, so-called queue buffers are to be provided in the switching node. In the queue buffer one or a plurality of these blocks are temporarily stored until an empty frame is available for them.

With respect to the buffer arrangement the switching nodes can be centrally buffered systems (for example, known from the European Patent Specification No. 0 183 592) or decentrally buffered systems. In centrally buffered systems there is only one buffer, in which each incoming line delivers its arriving blocks and which is read again for these blocks by each outgoing line. Systems having a decentralized buffering are further distinguished by the fact whether a buffering of blocks takes place only on the input side (an embodiment thereof is described in the not prepublished German Patent Application with the official file reference No. B 37 14 385.9) or whether the buffers are exclusively arranged for the outgoing lines (compare, for example, IEEE B 10.2.1, 1987, "The Knock-out Switch: A Simple, Modular Architecture for High-Performance Packet Switching" by J. S. Yeh et al) or whether systems are concerned having an input and output buffering.

In addition, the switching node has for its object to set up connections between the subscribers of the wideband transmission system, which is characterized as follows:

The information is to be available in digital form, analog data are to be digitized, if necessary.

The information available in digital form is split up into blocks of equal lengths.

The blocks—provided with a header of h bits in length—are disposed of at a switching node.

The latter transfers the blocks, depending on the destination, to other switching nodes, until one of these nodes can deliver the block to the desired end subscriber.

The header of a block may, if necessary, be changed (converted) by a node.

The blocks are transmitted in a fixed time frame which is just sufficient for the transmission of one block. The length of a block is measured in bits, consequently, the duration of a time frame is the clock pulse time times the overall block length.

Before transmission, the switching nodes have to synchronize with the beginning of a time frame. Since an enlarged network cannot operate in complete synchronism, each junction circuit between two nodes—alternatively called trunk line—is to be synchronized. The switching nodes themselves are to adjust, by means of buffering, the external clock to their internal clock.

The most important efficiency criteria of such a system are the anticipated number of lost blocks, as well as the delay of blocks in the switching nodes, or their variation in transfer time respectively. The former can always be reduced at will by means of sufficiently large buffers, which increases, however, the sojourn times. From this it will be evident that these two requirements represent incompatible objects.

In each case queue buffers are to be provided when realising a switching network. The queue buffers can then be positioned on the input side at the junctions of the switching matrix or on the output side. Such a switching matrix will become the most cost-effective when the buffers are to be incorporated only on the input side or output side respectively.

The header should be kept brief for economical reasons, so that a number cannot be used by for example several million subscribers. Consequently, only virtual connections are set up for each subscriber pair: the header is thus used only for one connection at a time. It will be seen that it is most advantageous when a block receives a new header on each trunk line between two nodes. This necessitates that each header is to be converted before the block can be transferred to the trunk line through which it is to be retransmitted. For this conversion, as well as the switching of the outgoing trunk line, sufficient time has to be provided.

As shown in the above embodiments, the arrangement of the switching network requires extensive investigations and careful consideration for a switching node of a wideband transmission system, in order to take account of the various dependence and mutual influences. Even if consideration concerning costs were to speak against using too many queue buffers, it would have to be taken into account that circuit technology for the systems under consideration verges on the limits of the present semi-conductor switch times, and thus that in this case the functionality of such systems is more important than minimizing the cost thereof. More specifically, possible bottle-necks in the performance are to be recognized early. Bottle-necks in the performance can occur when various blocks are simultaneously transferred through the switching network of an exchange. The blocks can influence each other when in the switching network only a few links are available as necessary links. Two types of influencing are especially important in this connection: the conflict and the obstruction.

Two blocks (or the circuits transferring them) are in a mutually conflicting situation, when for the transmission the same circuit components are to be used. As a rule, one of the blocks will have priority over the other, and the other block either is to wait or be lost.

In case of obstruction, a block B is to wait for the processing of a block A, whereas simultaneously, however, A is not processed because there is a conflicting situation between block A and a third block C. Consequently, a normal queuing situation in a queue buffer is no objection, as long as the first block in the buffer is transferred at each frame clock. Only when this buffer is in a conflicting situation and is not served, as a result of which, however, no other block can be simultaneously transmitted in this queue buffer, there will be no obstruction.

The idea of obstruction is important for the evaluation of the performance of such systems. Because, when a queue buffer which is not empty cannot be finished during a frame period, one can imagine that an additional "virtual" block will be processed instead. The sum of the virtual and real load is then the overall load of the system. The virtual load in several switching networks can nearly become as large as the real load. This is especially true for switching networks utilizing input buffering.

The invention has for its object to provide a switching network for a switching node of a wideband transmission system such that the occurrence of bottle-necks in the performance in the switching network is largely avoided.

This object is accomplished according to the invention by a switching network having the characteristic features of the Patent claims.

The claimed switching networks are advantageous in that the transmission rate of the switching network is enlarged in a simple fashion, whereas no rather large delays occur when the blocks are switched through the switching network and conflicts are largely avoided.

As a consequence of the change in the allocation strategy in a switching network control, the loss probability for the blocks is even further reduced.

The invention will be further described and explained with reference to various switching networks shown in the drawing Figures, in which.

Figure 3:
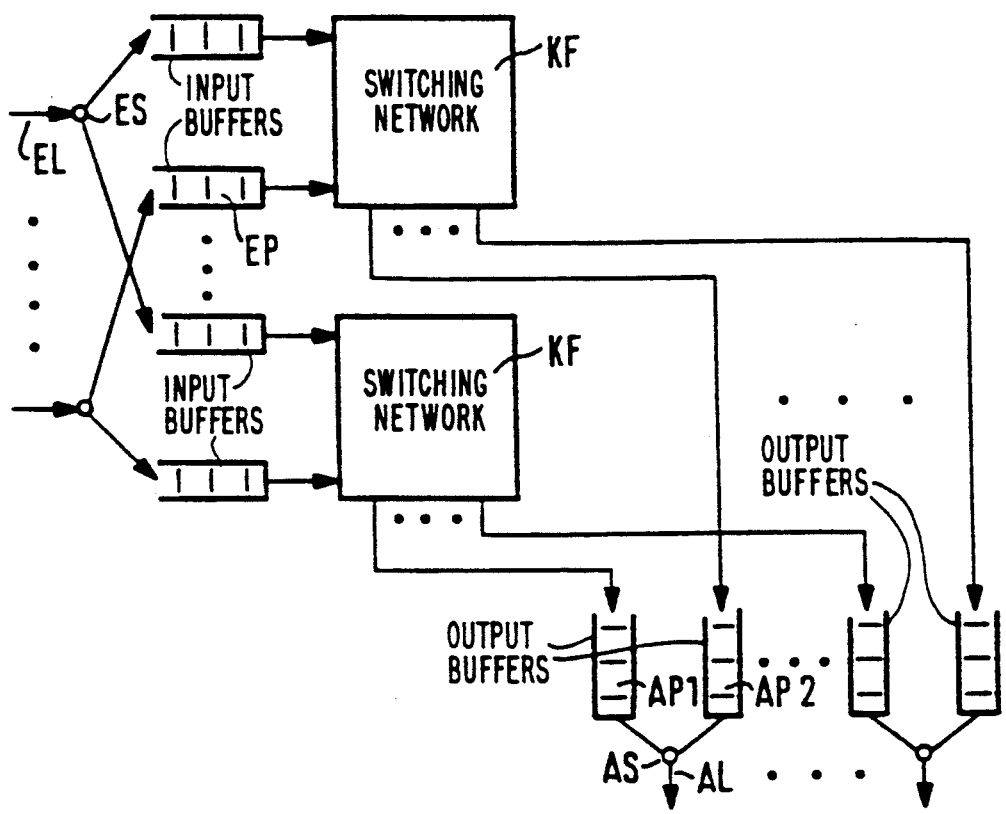
FIG. 3 shows an embodiment in which the switching network itself is multiplied.
Figure 4:
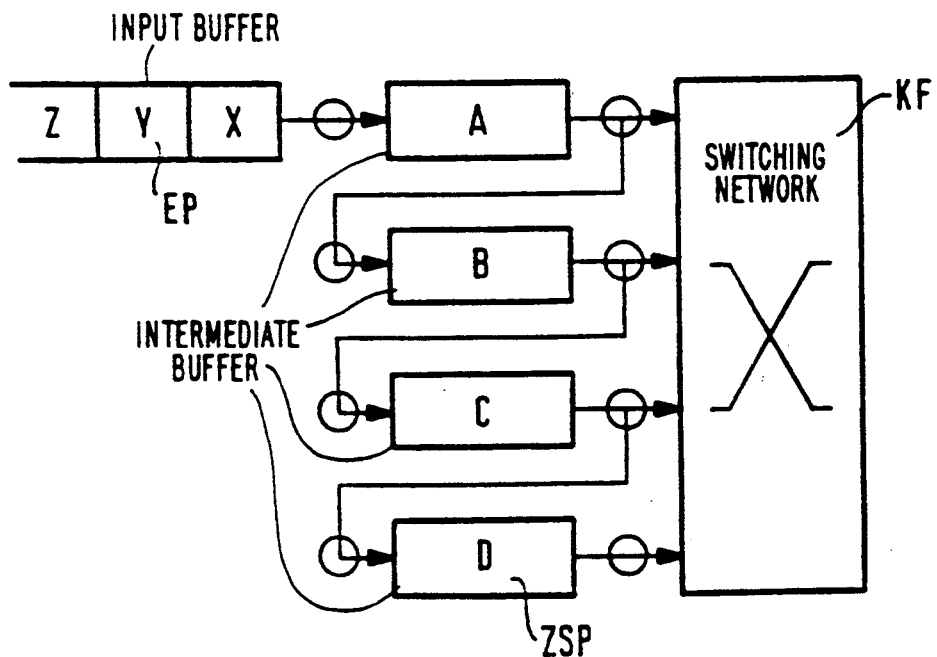
Figure 5A:
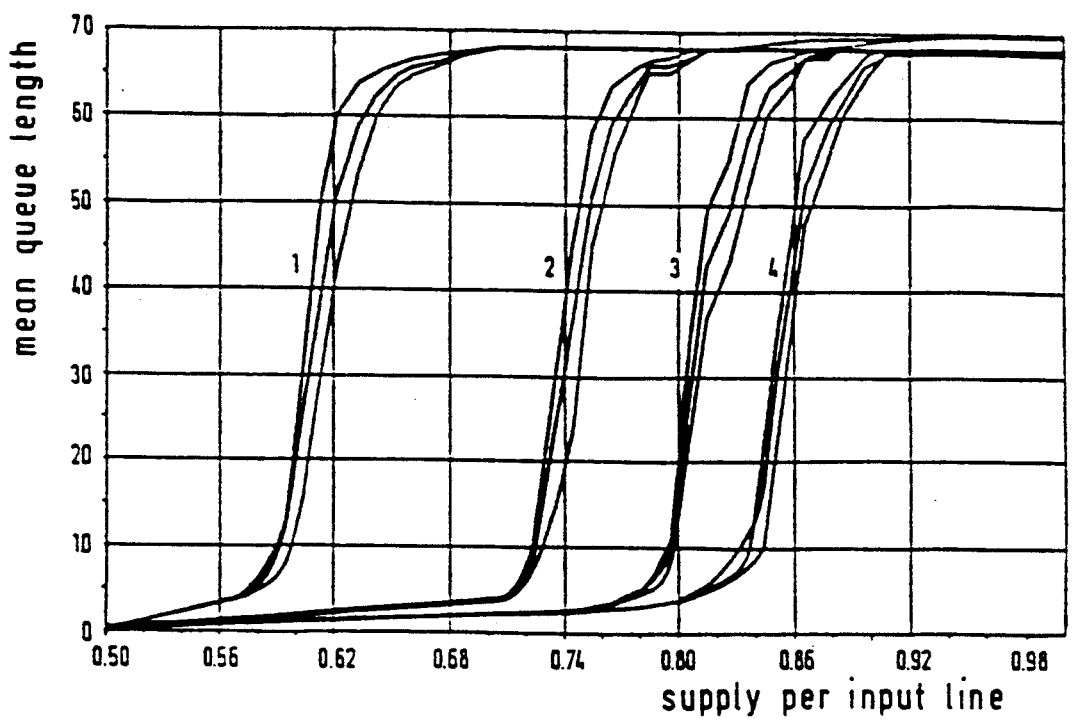
Figure 5B:
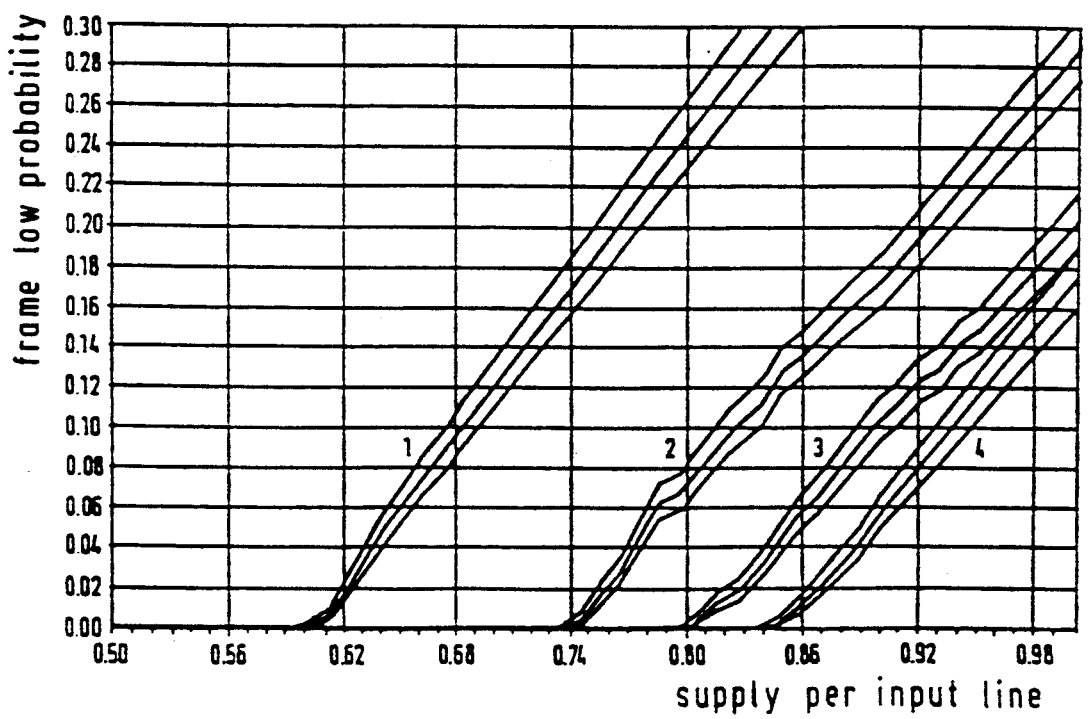
Figure 6:
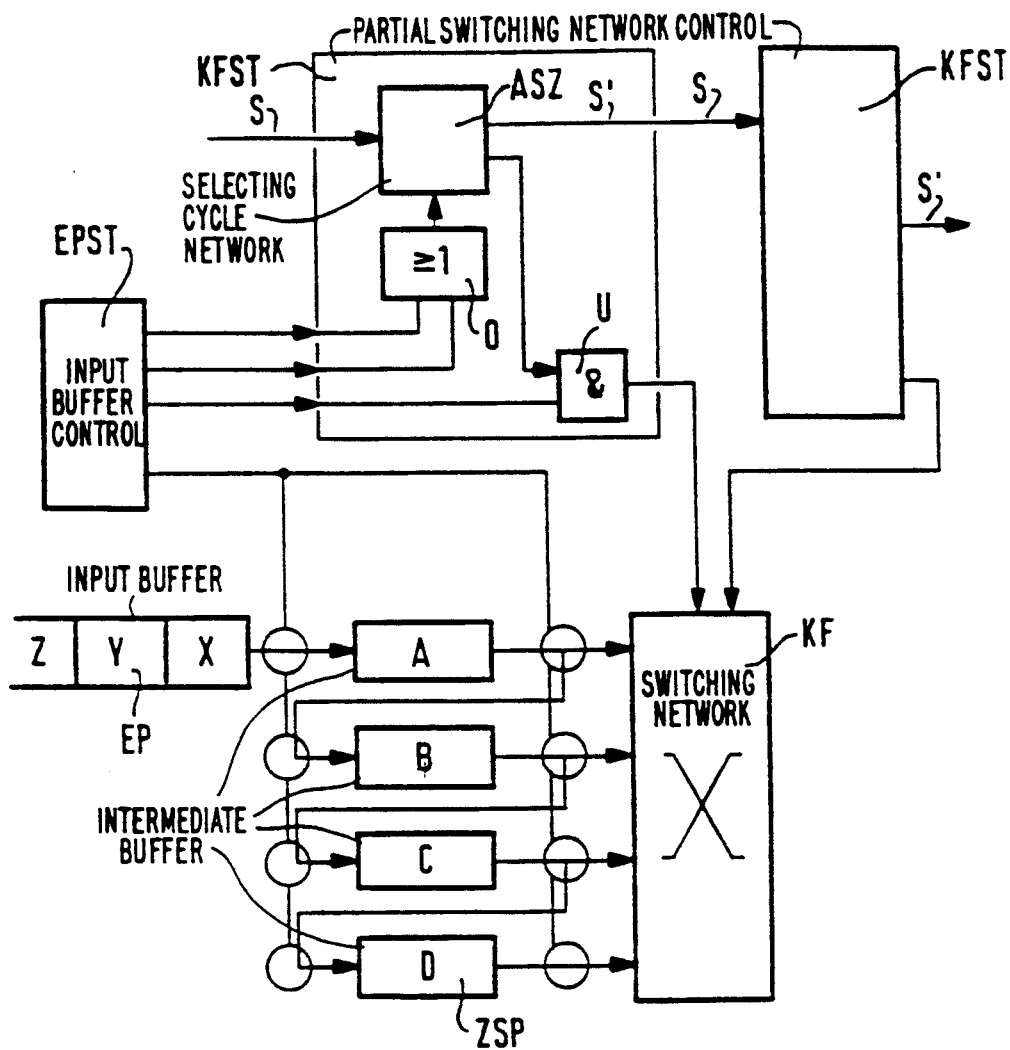
Figure 7:
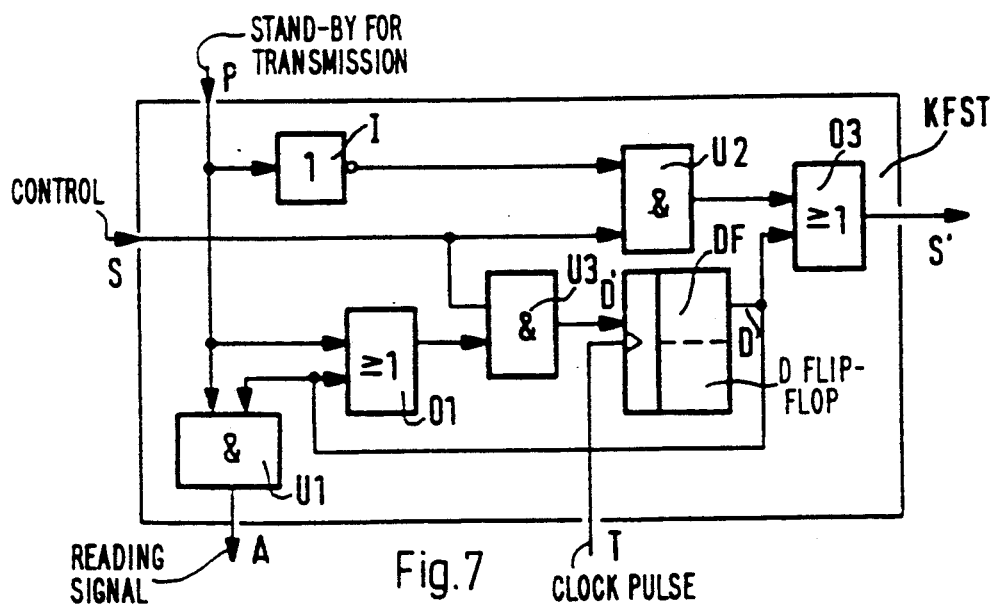

FIG. 4 shows a switching network with a larger degree of buffer access of the input buffer control, FIG. 5a and 5b show the mean queue length of the input buffers and the frame loss probability for several embodiments for switching networks in accordance with FIG. 3, FIG. 6 shows a first embodiment for a partial switching network control and FIG. 7 shows a second embodiment for a partial switching network control.

Figure 1:
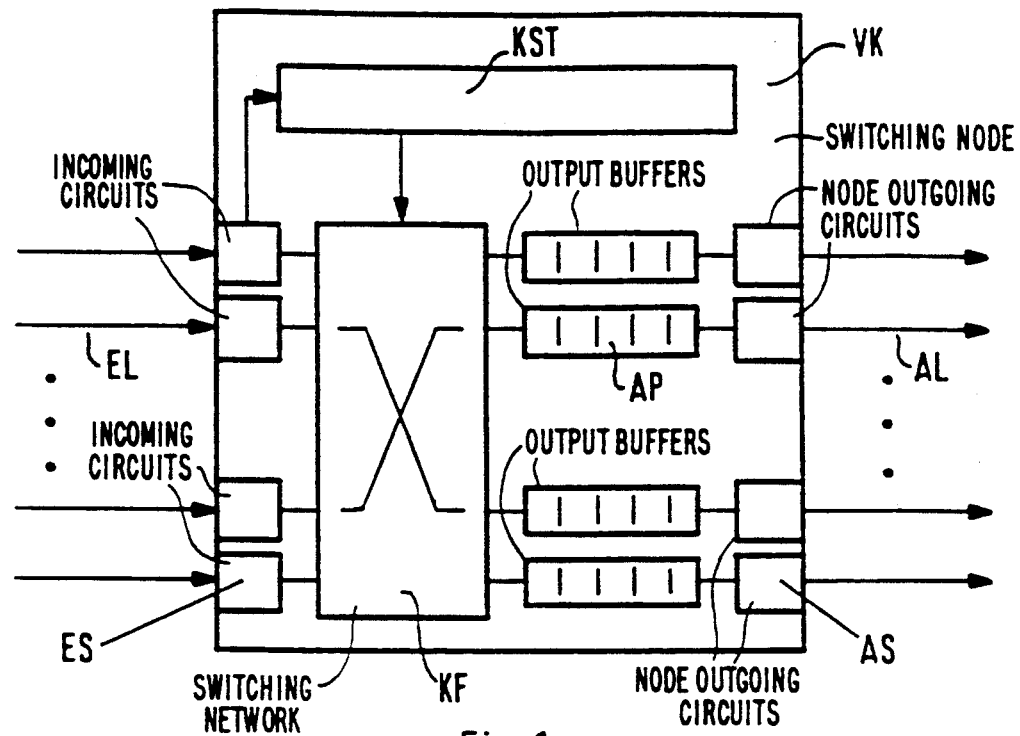
FIG. 1 shows in a block diagram the basic structure of a switching node.

FIG. 1 shows the basic structure of a switching node VK in a wideband transmission system, in which the messages are segmented into blocks. The blocks are transferred through wideband transmission links of the wideband transmission system according to an asynchronous time-division multiplex method. In the switching node VK the blocks, received from the incoming circuits ES connected to the incoming lines EL of the node, are buffered before being forwarded to the node outgoing circuit AS. FIG. 1 shows the buffering of the blocks in output buffers AP connected to a switching network KF.

By means of the switching network KF blocks allow to be switched from a plurality of incoming lines EL onto a plurality of outgoing lines AL. In the not prepublished German Patent Application with the official file reference P 37 14 385.9 a switching arrangement is described, which is able to provide a connection between an incoming line EL and any outgoing line AL for the duration of the transmission of one block. However, it has turned out that the traffic capacity of a general switching arrangement is constrained by the occurrence of conflicting situations. This happens when two or more of the incoming lines EL are offered blocks for the same outgoing line AL. Because each outgoing line AL can accept only one block, the blocks that cannot be released are obstructed on the incoming line EL. Since they should not be lost, the blocks are to be buffered. The memories used for this purpose have only a finite capacity. It has been examined that what block-load of the incoming lines EL there will be such a large queue that arriving blocks may be lost because the buffer capacity in the queue buffer (for example input buffer) is not sufficient for them.

The examinations have shown that with an equal load of all incoming lines EL, already at a relative traffic supply of a little over 50%, large loss probabilities can develop for the blocks (also compare FIGS. 5a and 5b). This is not sufficient for most applications, because for such lines a much higher load is planned. In addition, the proportions with a-symmetrical load can deteriorate even further.

The boundary conditions resulting from the performance tests are changed by the switching networks and switching network control respectively, shown in the drawing, so that no larger delays and losses of the blocks can arise. This can take place in various ways or combinations:

The transmission rate of the switching network can be enlarged by structural changes The switching network can be multiplied The input buffers can be reorganized The allocation strategy can be changed.

The performance of the wideband transmission system can be augmented because the switching network can switch more rapidly. This can be realized by using a faster technique which, however, does not seem feasible yet with present-day semi-conductor technology. Consequently, structural measures are to be provided for achieving a more rapid switching of the switching network.

Figure 2:
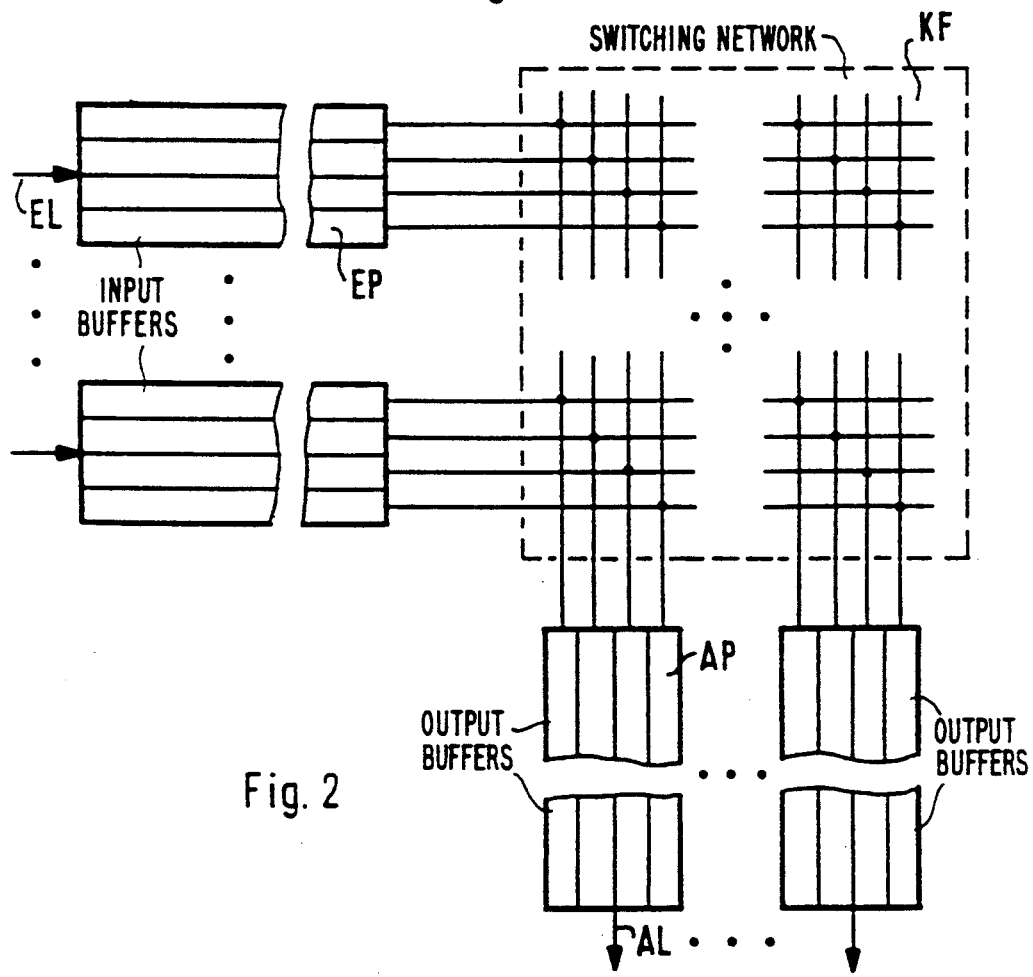
FIG. 2 shows a switching network with a bit-parallel block transfer.

In FIG. 2 is shown a switching network KF, in which the blocks are transferred in a bit-parallel mode, reducing the transfer time of the blocks in the switching network KF and the probability of conflicts. With bit-parallel transmission, when compared to purely bit-serial transmission, a plurality of lines instead of one line are switched through in each switching node of the switching arrangement and the blocks are segmented into sub-blocks of a corresponding number of bits.

In the embodiment of the switching network KF represented in FIG. 2, 4 bits are transferred in a bit-parallel mode. The control logic need not be different from the one described in P 37 14 385.9, but a correspondingly larger number of switches can be provided, in this case four times as many, that switch the incoming line EL onto the outgoing line AL.

As is the case with all methods enlarging the transfer rate of the switching network, more than one block can occur at an outgoing circuit AS during the period of time in which one block can be put onto a truck line. Consequently, these blocks have to be buffered additionally.

Since integrated queue buffers (for example input buffers EP or output buffers AP) usually have clock rates, which are distinctly below that of the trunk lines, it would also be meaningful in this case to buffer the blocks in parallel. So doing, the time required for clocking a block through would be reduced in accordance with the degree of parallelization.

In order to increase the transfer rates of the switching network, also the switching network itself can be multiplied. In each incoming circuit ES a switch distributes the arriving blocks evenly over the individual switching networks KF so that their load remains below a critical boundary. At the output the blocks, which are planned for the same outgoing line AL, are stored in a common buffer until they are released.

With this method, for which an embodiment having two switching networks is shown in FIG. 3, also a queue buffer can be provided at the output, which buffer additionally is to have the ability to simultaneously accept more than one block. Since this is difficult from a technique point of view, the embodiment represented in FIG. 3 comprises their own buffer AP1, AP2 respectively, for the switching network KF and output circuit AS. The outgoing circuit AS then selects a block from all blocks from all buffers AP1, AP2 assigned thereto, which can be effected by means of an n:1 multiplexer. This method definitely reduces the otherwise usable multiplexing facility of the queue buffers. Also a combination of the two methods with various short input buffers and a longer common queue buffer is possible.

In this switching network it may happen that blocks to be transferred from the same incoming circuit ES onto the same outgoing circuit AS—and thus belonging to a connection—overtake each other. However, this is to be avoided as the order of the blocks represents necessary information for the subscriber. This can be attained, for example, in that the blocks contain an identification code which is used only inside a switching node VK.

As performance evaluation has shown, it is to be avoided that blocks are delayed in an incoming circuit ES. when the outgoing circuit AS to which the incoming circuit ES wishes to send its blocks, is free. This may happen when the input buffer EP can only finish the blocks which is foremost in the input buffer EP. If such conflicts are avoided, in that an incoming circuit ES is allowed of transfer two or more blocks foremost in the input buffer EP to the switching network KF, the performance of the system is considerably improved.

FIGS. 5a and 5b show that when the degree of access of the buffer is enhanced to 2 blocks, the loading capacity of the system is enhanced by approximately 14%. Consequently, this measure implies a distinct improvement of the performance of the system, without problems arising in the switching networks of FIG. 2 or FIG. 3 with the output buffers AP or blocks overtaking each other.

To augment the degree of access of the queue buffer, the latter is subdivided into the input buffer EP and the intermediate buffer ZSP, which are to be considered only as logically disconnected from the input buffer EP; they can form a part of this buffer. A block in the intermediate buffer A is transferred to the switching network KF, when the latter is in the position to accept the block. If it cannot accept the block, it is moved to the intermediate buffer B instead. In both cases the next block X is clocked out of the input buffer EP into the intermediate buffer A. This takes place as long as an empty intermediate buffer ZSP is found. Subsequently, the input buffer control EPST waits until the block can be released. As it is in a position now to present four blocks to the system, the probability thereof is very great. Hereinafter, this correlation for a degree of buffer access of 4 is represented in a Table.

| Transmission takes place | | | | Sequential block in lieu of | | | | | |
|---|---|---|---|---|---|---|---|---|---|
| A | B | C | D | A | B | C | D | X | Y |
| — | — | — | — | A | B | C | D | X | Y |
| A | — | — | — | X | B | C | D | Y | Y |
| — | B | — | — | X | A | C | D | Y | Z |
| — | — | C | — | X | A | B | D | Y | Z |
| — | — | — | D | X | A | B | C | Y | Z |
| A | B | — | — | X | — | C | D | Y | Z |
| A | — | C | — | X | — | B | D | Y | Z |
| A | — | — | D | X | — | B | C | Y | Z |
| — | B | C | — | X | A | — | D | Y | Z |
| — | B | — | D | X | A | — | C | Y | Z |
| — | — | C | D | X | A | B | — | Y | Z |
| A | B | C | — | X | — | — | D | Y | Z |
| A | B | — | D | X | — | — | C | Y | Z |
| A | — | C | D | X | — | B | — | Y | Z |
| — | B | C | D | X | A | — | — | Y | Z |
| A | B | C | D | X | — | — | — | Y | Z |

A decision logic sees to it that all blocks in the intermediate buffers ZSP of an incoming ES are transferred to the switching network KF in the right order. The decision logic comprises so-called partial switching network controls KFST as well as input buffer controls EPST in addition to the switching network control represented in FIG. 6.

The partial switching network control KFST comprises a selecting cycle circuit ASZ, which is connected to the preceding and subsequent partial switching network control KFST through a line conveying the control signal S or S' respectively. For the case of an input buffer cycle circuit ASZ is connected to the output of an OR gate O and an input of an AND gate U. The two inputs of the OR gate O and the second input of the AND gate U are connected to the input buffer control EPST having an enhanced degree of buffer access.

The partial switching network control KFST stores the information about which input buffer EP was connected last to the output buffer AP assigned to this partial switching network control KFST. For the case in which a plurality of input buffers EP are to be connected to the output buffer AP assigned to the partial switching network control KFST, the partial switching network control KFST selects the input buffer EP which is next in place to the previously read input buffer EP of all input buffers EP according to a predetermined selecting cycle.

The selecting cycle is, for example, determined by the space-division arrangement of the input buffers EP.

The decision logic thus selects an incoming circuit ES from all incoming circuits ES that wish to transmit to the same outgoing circuits AS. This is done cyclically. FIG. 7 shows an embodiment for a switching network control.

The partial switching network control KFST comprises a D flip-flop DF, in which the information is stored about which input buffer EP was previously connected to the output buffer AP assigned to this partial switching network control KFST. To apply a signal P, denoting stand-by for transmission, the input buffer EP is connected to a first input of a first AND gate U1, a first input of a first OR gate O1 and the input of an inverter I. The output of the inverter I is connected to a first input of a second AND gate U2.

In order to supply a control signal S to the preceding partial switching network control KFST, it is connected to the second input of the second AND gate U2 and the first input of a third AND gate U3. The second output of the third AND gate U3 is connected to the output of the first AND gate O1 and the output of the third AND gate O3 is connected to the D input of the D flip-flop DF. The Q output of the D flip-flop DF is connected to the first OR gate O1 and to the second input of the first AND gate U1. The output of the second AND gate U2 is connected to the second input of the third OR gate O3. To supply a reading signal A, the output of the first AND gate U1 is connected to the input buffer EP and the subsequent partial switching network control KFST is connected to the output of the third OR gate O3.

The operation of this partial switching network control is as follows:

In the D flip-flop DF it is stored which incoming circuit ES as the last one to send. This circuit now has the least priority. The decision logic selects the incoming circuit ES which wishes to send a block onto the outgoing circuit AS and comes next in the cycle. The D flip-flow DF thereof is set, the previous one reset, and because the reading signal A is sent, this incoming circuit ES is informed that it can release a block.

Inside the input buffer control EPST a signal is formed for all intermediate buffers ZSP, which informs the decision logic that one of the intermediate buffers ZSP of this incoming circuit ES wishes to send towards this outgoing circuit AS. Once this line has been released (by sending the read signal A), the block having the first position (foremost in the buffer) is selected. This block can then be transferred to the outgoing circuit AS.

In a switching network as shown in FIG. 4 the number of incoming lines of the switching network KF is enlarged (multiplied by 4). It is possible also to enlarge the number of outgoing lines of the switching network KF and assign a plurality of lines in the switching network KF to each outgoing trunk line. It is again necessary in this context that also in the outgoing circuit AS queue buffers are to be provided, since the block access rate can exceed for a short period of time the maximum transfer rate. The performance of such a switching network is hardly distinghuished from that of a switching network according to FIG. 4 which, however, manages without output buffer AP.

The operation of the switching network represented in FIG. 7 can also be described as follows by the equations according to the Boolean algebra:

$$D' = S \wedge (D \vee P) \quad \text{(I)}$$

$$S' = D \wedge (S \wedge P) \quad \text{(II)}$$

$$A = D \wedge P \quad \text{(III)}$$

The meaning of the signals being:
S: Outgoing circuit is free
D: This incoming circuit transmitted last
A: This incoming circuit is in a position to transfer
P: Report of a wish for transfer
T: Clock pulse.

In the not prepublished German Patent Application having the official file reference No P 37 14 385.9 it was pointed out that a decision logic can provide that all blocks, that wish to send at one and the same instant on the same outgoing circuit As, do so in a specific order. This allocation strategy operates with priorities because it finishes specific incoming circuits ES (with lower numbers) with priorities on the basis of the spatial arrangement. Consequently, an additional loss probability will arise depending on the number of the incoming circuit ES.

The switching network control on hand (decision logic) can also be used with the subject of P 37 14 385.9.

But also the allocation strategy proposed therein can be improved by very simple measures. For this purpose the order of the priorities in the cycle chosen therein can be simply changed by changing the connection points around. Each incoming circuit ES could have a different priority on account of different outgoing circuits AS, for example in the following form with 16 incoming and outgoing circuits:

| Output | Declining priority of the incoming circuits |
|---|---|
| −1 | : 1 2 3 4 5 6 7 8 9 10 11 12 13 14 15 16 |
| −2 | : 2 3 4 5 6 7 8 9 10 11 12 13 14 15 16 1 |
| −3 | : 3 4 5 6 7 8 9 10 11 12 13 14 15 16 1 2 |
| ... | ... |
| −16 | : 16 1 2 3 4 5 6 7 8 9 10 11 12 13 14 15 |

Besides this permutation of the order and hence change of the priority also different permutations are possible.

What is claimed is:

1. A switching node for use in a wideband transmission system which transfers messages through wideband transmission paths according to an asynchronous time-division multiplex method, the node comprising:
   a) a plurality of input buffers functioning as queue buffers;
   b) a switching network coupled with outputs of the input buffers; and
   c) a plurality of incoming circuits, each incoming circuit
      i) having a respective plurality of outputs for coupling with inputs of a subset of the input buffers, and
      ii) being operative for demultiplexing and transferring blocks to its subset of input buffers.

2. The node of claim 1 wherein
   a) the switching network comprises a plurality of switching matrices;
   b) each of the switching matrices is assigned to a respective group of the input buffers; and
   c) each subset of the input buffers includes one of the input buffers from each of the respective groups of input buffers.

3. A switching node for use in a wideband transmission system which transfers messages through wideband transmission paths according to an asynchronous time-division multiplex method, the node comprising:
   a) a plurality of incoming circuits;
   b) at least one input queue buffer coupled to outputs of the incoming circuits;
   c) a switching network coupled to an output of the at least one input queue buffer, which network includes a plurality of output lines;
   d) a plurality of output buffers (AP), each coupled with a respective one of the plurality of output lines, and
   e) a plurality of outgoing circuits, each coupled via a subset of the output buffers to a subset of the plurality of output lines, which subset of the output lines includes at least two lines, so that blocks are multiplexed from the plurality of output lines.

4. The node of claim 3 wherein
   a) the switching network comprises a plurality of switching matrices;
   b) each of the switching matrices is coupled with a respective group of the output buffers; and
   c) each subset of the output buffers includes a one of the output buffers from each of the respective groups of output buffers.

5. A switching node for use in a wideband transmission system which transfers messages made up of bits segmented into blocks through wideband transmission paths according to an asynchronous time-division multiplex method, the node comprising:
   a) an input buffer (EP) functioning as a queue buffer and having an input for receiving and queing the message blocks and an output;
   b) a plurality of series-connected intermediate cascaded buffers (ZSP) each having an input and an output with the input of the first intermediate buffer connected to the output of the input buffer (EP) and with the input of each successive intermediate buffer connected to the output of the preceding buffer in the cascaded arrangement,
   c) a switching network (KF) having a plurality of sets of inputs coupled with the intermediate buffer outputs and a plurality of outputs with each network output being connectable to any set of switching network inputs and with each input of an input set of the switching network being connectable to the output of one of the intermediate buffers such that any message block at an output of an intermediate buffer can be switched via the network to any output of the network;
   d) input buffer control means (EPST) connected to the switching network and to the intermediate buffers for enabling the switching network and the intermediate buffers to transfer the block stored foremost in the first intermediate buffer to the intended switching network outputs if not busy, and if the intended network output is busy then moving the foremost block in the first intermediate buffer to the second intermediate buffer to allow a succeeding block in the first intermediate buffer to be transferred to its intended output circuit.

6. A switching node as claimed in claim 5, wherein the buffer control means is also operative to transfer the foremost block of the second intermediate buffer to its intended switching network output if not busy, and if intended network output is busy then moving the foremost block in the second intermediate buffer to the third intermediate buffer to allow a succeeding block in the second intermediate buffer to be transferred to its intended output circuit.

7. A switching node for use in a wideband transmission system which transfers messages made up of bits segmented into blocks through wideband transmission paths according to an asynchronous time-division multiplex method, the node comprising:
 a) an input buffer (EP) functioning as a FIFO buffer and having an input for receiving and queing the message blocks and an output;
 b) at least first and second intermediate buffers (ZSP) each having an input and an output with the input of the first intermediate buffer connected to the output of the input buffer (EP), and with the input of the second intermediate buffer connected to the output of the first intermediate bufer,
 c) a switching network (KF) having a plurality of sets of inputs coupled with the intermediate buffer outputs and a plurality of outputs with each network output being connectable to any set of switching network inputs and with each input of an input set of the switching network being connectable to the output of one of the intermediate buffers such that any message block at an output of an intermediate buffer can be switched via the network to any output of the network;
 d) input buffer control means (EPST) connected to the switching network and to the intermediate buffers for enabling the switching network and the input and intermediate buffers to transfer the block stored foremost in the input (EP) buffer to the first intermediate buffer and to transfer the block stored foremost in the first intermediate buffer via the switching network to the intended switching network output if not busy, and if the intended network output is busy then moving the foremost block in the first intermediate buffer to the second intermediate buffer to allow a succeeding block in the first intermediate buffer to be processed.

8. A switching node for use in a wideband transmission system which transfers messages which are segmented into blocks through wideband transmission paths according to an asynchronous time-division multiplex method, the node comprising:
 a) at least first and second sets of input buffers each having inputs and outputs and each functioning as a queue buffer;
 b) at least first and second switching networks having inputs coupled with outputs of the first and second input buffer sets and
 c) a plurality of incoming circuits for receiving incoming message blocks, each incoming circuit being connected to inputs of a buffer in each input buffer set for demultiplexing and transferring blocks to the respective buffers of the input buffer sets.

9. A switching node for use in a wideband transmission system which transfers messages which are segmented into blocks through wideband transmission paths according to an asynchronous time-division multiplex method, the node comprising:
 a) at least first and second sets of output buffers each having inputs and outputs and each functioning as a queue buffer;
 b) at least first and second switching networks having outputs coupled with inputs of the first and second output buffer sets and inputs for receiving message blocks, each network being connected to an output buffer of each set;
 c) a plurality of outgoing circuits connected to an output of an output buffer of each set for receiving message blocks therefrom, each outgoing circuit being connected for multiplexing and transferring blocks from the respective buffers of the buffer set to which each is connected.

* * * * *